United States Patent
Tong et al.

(10) Patent No.: US 9,766,020 B2
(45) Date of Patent: Sep. 19, 2017

(54) HEAT RECOVERY DEVICE AND ALIGNMENT FILM CURING SYSTEM

(71) Applicants: BOE TECHNOLOGY GROUP CO., LTD., Beijing (CN); HEFEI XINSHENG OPTOELECTRONICS TECHNOLOGY CO., LTD., Hefei, Anhui Province (CN)

(72) Inventors: Qing Tong, Beijing (CN); Yong Yang, Beijing (CN); Weijing Liao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 111 days.

(21) Appl. No.: 14/805,528

(22) Filed: Jul. 22, 2015

(65) Prior Publication Data

US 2016/0153716 A1    Jun. 2, 2016

(30) Foreign Application Priority Data

Nov. 28, 2014 (CN) .......................... 2014 1 0707124

(51) Int. Cl.
*F27B 3/26* (2006.01)
*F28D 21/00* (2006.01)
(Continued)

(52) U.S. Cl.
CPC .......... *F28D 21/001* (2013.01); *F27D 17/004* (2013.01); *F28D 7/08* (2013.01); *F28F 27/02* (2013.01); *G02F 1/1337* (2013.01)

(58) Field of Classification Search
CPC .......... B01D 5/0003; F23C 9/00; F23G 7/066; F01K 23/10; F28D 21/0003; F28D 7/024; F28F 27/02; F27B 3/26
See application file for complete search history.

(56) References Cited

U.S. PATENT DOCUMENTS

| 4,044,820 | A | * | 8/1977 | Nobles | .................. | F23L 15/045 |
| | | | | | | 126/117 |
| 4,300,527 | A | * | 11/1981 | Montague | ............... | F23L 11/02 |
| | | | | | | 126/112 |

(Continued)

FOREIGN PATENT DOCUMENTS

| CN | 201909551 U | 7/2011 |
| CN | 202082947 U | 12/2011 |

(Continued)

OTHER PUBLICATIONS

First Chinese Office Action Appln. No. 201410707124.3; Dated Dec. 25, 2015.

*Primary Examiner* — Gregory A Wilson
(74) *Attorney, Agent, or Firm* — Ladas & Parry LLP

(57) ABSTRACT

A heat recovery device and an alignment film curing system. The heat recovery device can be provided outside a heating device, and it includes a first recovery unit including a first chamber and a first communicating pipe that is provided in the first chamber. The first chamber has a first gas inlet and first gas outlet, a first waste gas inlet and a first waste gas outlet, and the first communicating pipe is arranged in a winding way and connected between the first gas inlet and the first gas outlet in an enclosed way. The first gas inlet is connected to a gas supply pipe of the heating device, the first gas outlet is connected to an intake pipe of the heating device, the first waste gas inlet is connected to an exhaust (Continued)

pipe of the heating device, and the first waste gas outlet is configured to discharge waste gas.

17 Claims, 3 Drawing Sheets

(51) Int. Cl.
*F27D 17/00* (2006.01)
*F28F 27/02* (2006.01)
*F28D 7/08* (2006.01)
*G02F 1/1337* (2006.01)

(56) References Cited

U.S. PATENT DOCUMENTS

| | | | | |
|---|---|---|---|---|
| 5,207,972 | A * | 5/1993 | Hemsath | F27B 3/26 266/262 |
| 8,491,678 | B1 * | 7/2013 | Bossard | C01B 3/38 165/104.34 |
| 8,980,192 | B2 * | 3/2015 | Maslov | B01J 7/00 165/108 |
| 9,194,584 | B2 * | 11/2015 | Watts | F23C 9/00 |
| 9,267,414 | B2 * | 2/2016 | Yin | F01K 25/10 |
| 9,273,608 | B2 * | 3/2016 | Maslov | F02C 3/22 |
| 9,353,946 | B2 * | 5/2016 | Hamrin | F23N 5/00 |
| 2002/0026997 | A1 | 3/2002 | Yanadori et al. | |
| 2011/0289905 | A1 * | 12/2011 | Acre | F01N 3/043 60/320 |
| 2013/0232984 | A1 * | 9/2013 | Lampe | F02C 3/22 60/772 |
| 2015/0129410 | A1 * | 5/2015 | Govindan | C02F 1/04 202/185.3 |

FOREIGN PATENT DOCUMENTS

| | | |
|---|---|---|
| CN | 102878807 A | 1/2013 |
| CN | 203963975 U | 11/2014 |
| KR | 20020018575 A | 3/2002 |

* cited by examiner

HEAT RECOVERY DEVICE AND ALIGNMENT FILM CURING SYSTEM

TECHNICAL FIELD

Embodiments of the present disclosure relate to a heat recovery device and an alignment film curing system.

BACKGROUND

Liquid Crystal Display devices (LCDs) are one kind of the flat panel display devices widely applied at present. The main constituent component of the liquid crystal display device is a liquid crystal panel, and the liquid crystal panel mainly includes a color filter substrate, an array substrate and liquid crystals disposed between the two substrates. The array substrate has a control element provided therein, and the generated electric field is controlled by the control element so as to drive liquid crystals so that an image display is realized.

SUMMARY

According to an embodiment of the present disclosure, a heat recovery device is provided, which is capable of being disposed outside a heating device. The heat recovery device includes a first recovery unit that includes a first chamber and a first communicating pipe provided within the first chamber, wherein the first chamber includes a first gas inlet and a first gas outlet, a first waste gas inlet and a first waste gas outlet, the first communicating pipe is arranged in a winding way and connected between the first gas inlet and the first gas outlet in an enclosed way, the first gas inlet is connected to a gas supply pipe of a heating device, the first gas outlet is connected to an intake pipe of the heating device, the first waste gas inlet is connected to an exhaust pipe of the heating device, and the first waste gas outlet is configured to discharge of waste gas.

An alignment film curing system, including a heater, wherein the heater is provided with the heat recovery device.

DETAILED DESCRIPTION

Figure 1:
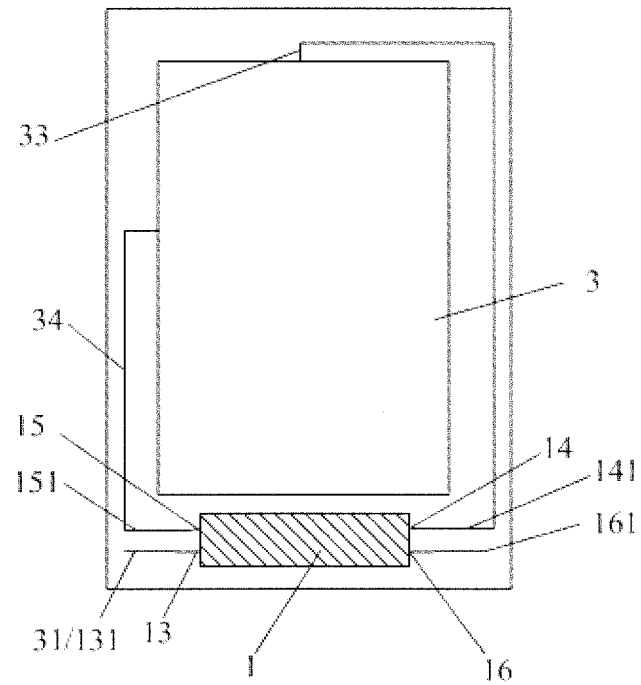
FIG. 1 is a structurally schematic view illustrating a heat recovery device in Embodiment 1 of the present disclosure.

Technical solutions according to the embodiments of the present disclosure will be described clearly and completely as below in conjunction with the accompanying drawings of embodiments of the present disclosure. It is apparent that the described embodiments are only a part of but not all of exemplary embodiments of the present disclosure. Based on the described embodiments of the present disclosure, various other embodiments and variants can be obtained by those of ordinary skill in the art without creative labor and those embodiments and variants shall fall into the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at least one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Inventors notice that in a process of manufacturing a liquid crystal panel, there are multiple steps or procedures that may require heating, and waste occurs in varying degrees to the heat in each of these heating steps or procedures. For example, in a cell-forming process of a liquid crystal panel, an alignment film curing process requires heating. The alignment film curing process refers to a cyclic reaction occurs to polyimide by evaporating an organic solvent in a high-temperature liquid, so as to form an alignment film with certain hardness and cyclic rate, by which, an initial orientation of liquid crystal molecules is controlled. The quality of the liquid crystal display device is directly affected by the hardness and cyclic rate of the alignment film, therefore an alignment film curing technology has very high requirements on the efficiency and stability of an air supply heating system. A conventional alignment film curing system suffers from issues that the heat is directly discharged, the heat recovery utilization efficiency is low, or the like, thus, a heater subjects to a large work load, and the stability of the equipment is affected when it runs for a long period of time.

It is an important to carry out further effective recovery and utilization of the heat so as to improve the utilization rate of heat recovery for energy saving and environmental protection.

A heat recovery device and an alignment film curing system according to the present disclosure will be described below in detail in conjunction with the accompany drawings and exemplary embodiments.

Embodiment 1

Figure 2A:
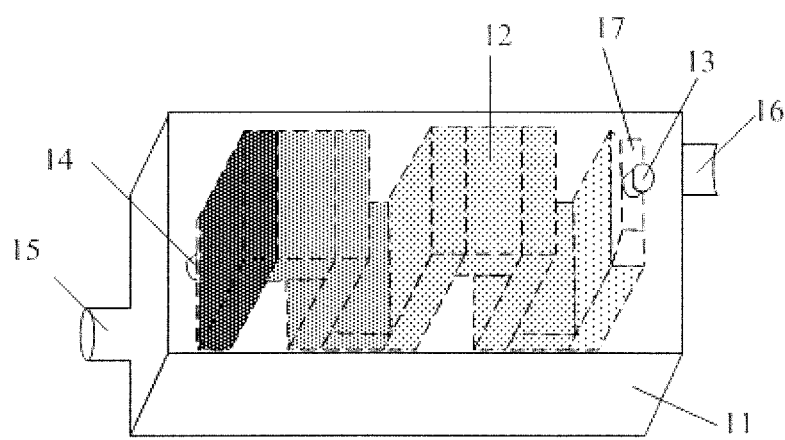
FIG. 2A is a structurally schematic view illustrating a first recovery unit in FIG. 1.

According to the present embodiment, a heat recovery device is provided. As shown in FIG. 1 and FIG. 2A, the heat recovery device can be disposed outside a heating device 3. It includes a first recovery unit 1, which includes a first chamber 11 and a first communicating pipe 12 disposed within the first chamber 11. The first chamber 11 has a first gas inlet 13 and a first gas outlet 14, a first waste gas inlet 15 and a first waste gas outlet 16, and the first communicating pipe 12 is arranged in a winding way and connected between the first gas inlet 13 and the first gas outlet 14 in an enclosed way. The first gas inlet 13 is connected to a gas supply pipe 31 of the heating device 3, the first gas outlet 14 is connected to an intake pipe 33 of the heating device 3, the first waste gas inlet 15 is connected to an exhaust pipe 34 of the heating device 3, and the first waste gas outlet 16 is configured to discharge waste gas. For example, the first gas inlet 13 is connected to an end of a first intake pipe 131, and the first gas outlet 14 is connected to an end of a first exhaust pipe 141. Another end of the first intake pipe 131 is connected to the gas supply pipe 31 (i.e. a relatively upstream intake pipe) of the heating device 3, and another end of the first exhaust pipe 141 is connected to the intake pipe 33 (i.e. a relatively downstream intake pipe) of the heating device 3. The first communicating pipe 12 is arranged in a winding way and connected between the first gas inlet 13 and the first gas outlet 14.

In the heat recovery device, as shown in FIG. 2A, the first gas inlet 13 and the first gas outlet 14 are located in two opposite walls of the first chamber 11. The first communicating pipe 12 is in a flat shape, and is extended tortuously from the first gas inlet 13 to the first gas outlet 14 along the first chamber 11, and the tortuously arranged first communicating pipe 12 does not contact the walls of the first chamber 11 except in the first gas inlet 13 and the first gas outlet 14. That is, the top and bottom of bending sections of the tortuously arranged first communicating pipe 12 are not in direct contact with the opposite walls of the first chamber 11 that are perpendicular to its walls with the first gas inlet 13 and the first gas outlet 14 therein, respectively, so that the intake pipe is surrounded by waste gas with afterheat, while the intake pipe of the heating device 3 is enabled to have the maximum effective contact area with waste gas with afterheat within the first chamber 11, thereby it can absorb the afterheat of waste gas discharged from the heating device 3 to a greater extent. Theoretically, in case that the process conditions permit, the larger the number of bending sections of the first communicating pipe 12 inside the first chamber 11 is, the better the effect of heat recovery and utilization is.

For example, within the first chamber 11, a wedge-like extension member 17 is further disposed between the first gas inlet 13 and the first communicating pipe 12. A larger end of the extension pipe 17 is adapted and joined to the first communicating pipe 12, and its smaller end is convergently shrinked and joined into the first gas inlet 13. By using the wedge-like extension member, flow direction of the intake gas can be better guided and adjusted, so as to achieve a uniform intake gas stream. The first communicating pipe 12 and the extension member 17 in FIG. 2A are each denoted by dotted lines, and this indicates that they are located inside the first chamber 11.

Figure 2B:
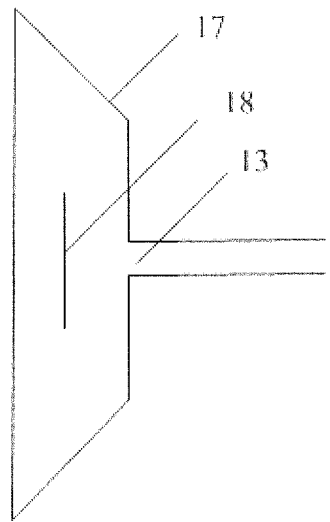
FIG. 2B is a structurally schematic view illustrating a wedge-like extension member and an airflow valve in FIG. 2A.

To control the flow direction of the exhaust gas flow in a better way, as shown in FIG. 2B, an airflow valve 18 is disposed at the location where the first gas inlet 13 is connected to the extension member 17. The airflow valve 18 has strip-shaped openings therein, that is, a strip-shaped filter valve is provided at the location of the gas inlet; or, the airflow valve 18 has mesh-shaped openings therein, that is, a mesh-shaped filter valve is provided at the location of the gas inlet. Provision of the airflow valve 18 allows the distribution of the intake gas that is raised in temperature by afterheat of the waste gas to be more uniform, and stability of the gas temperature raising is assured. Under the circumstances that the requirement on uniformity of the gas flow is normal, the airflow valve 18 may also be omitted. The wedge extension member 17 can be in other shapes, such as a pipe section.

As shown in FIG. 2B, which illustrates an internal structure of the wedge-like extension member 17 viewed from an intake direction. The intake gas of the heating device firstly enters into the entrance (i.e. the first gas inlet 13) of the wedge-like extension member 17 via the first gas inlet 13, and the gas flow is dispersed when it encounters the airflow valve 18, uniformly enters the inner space of the first communicating pipe 12 along inclined internal walls of the wedge-like extension member 17, flows from the first gas inlet 13 to the first gas outlet 14 along the first communicating pipe 12 and is raised in temperature by absorbing afterheat of the waste gas. The first communicating pipe 12 can be made of metal or metal alloys, or the like.

For example, the first communicating pipe 12 and the extension member 17 are made of stainless steel. Forming the first communicating pipe 12 and the extension member 17 by using stainless steel brings about not only a stable performance and a good thermal conductivity, but also an inexpensive price, and will not significantly increase the cost of equipment.

To better recover and utilize the obtained waste gas heat, the outsides of all the walls of the first chamber 11 may be applied with heat insulating material to prevent heat dissipation. For example, the outsides of the outer walls of the first chamber 11 may be coated with heat insulating material, such as a heat insulating cotton of low price. In another way, the outer walls of the first chamber 11 may be made with a hollow inner space, and the hollow inner space is filled with heat insulating material, such as heat insulating cotton.

Referring to FIG. 2A, in the first recovery unit 1 of the heat recovery device, the waste gas containing a large amount of heat enters the first chamber 11 from the first waste gas inlet 15, and fills the inside of the entire first chamber 11, and its heat is absorbed by the intake gas within the first communicating pipe 12; the waste gas that is lowered gradually in temperature is discharged from the first recovery unit 1 via the first waste gas outlet 16 (via the first waste gas exhaust pipe 161); the intake gas of the heating device passes through the first gas inlet 13 and enters the first communicating pipe 12 from the wedge-like extension member 17, advances along the winding first chamber 11 after it is shunted by the airflow valve 18, therein. The effective contact area between the waste gas heat and the intake gas of the first communicating pipe 12 (i.e. an intake pipe) is effectively increased by the first chamber 11, so that the intake gas in the intake pipe is continuously raised in temperature by absorbing the heat in the waste gas (small black dots that become denser continually from the first gas inlet 13 to the first gas outlet 14 in FIG. 2A to show the continuously raised temperature of the intake gas), finally, the intake gas is discharged from the first recovery unit 1 via the first gas outlet 14, and is conveyed to the heating device 3 for heating through the intake pipe 33. Here, the first gas inlet 13 and the first gas outlet 14 are each connected to a relative inlet end of the heating device 3, the metallic chamber is equal to a portion of the intake pipe 33 of the heating device 3, and the intake gas passing through this portion of the 'intake pipe' is preheated, allowing afterheat of the waste gas to be recovered and utilized again.

In the heat recovery device, by adoption of such a design in the first recovery unit that the intake pipe of the heating device is winding and flat, and in such a manner that the intake pipe is surrounded by afterheat, the effective area of contact between the intake pipe of the heating device and the waste gas containing afterheat is made to be the maximum, and the recovered heat is directly used to raise the temperature of the intake gas of the heating device, a higher heat recovery efficiency is achieved.

In examples, the first communicating pipe of the first recovery unit can be other shapes, such as winding tube, multiple groups of winding tubes, parallel tubes, parallel flat tubes, or multiple groups of flat structure of inner hollow.

In examples, two or more first recovery units can be disposed outside the heating device 3.

Embodiment 2

According to the present embodiment, a heat recovery device is provided. The difference between the heat recovery device and that in Embodiment 1 lies in that, the heat recovery device further includes a second recovery unit disposed between a first recovery unit and the intake pipe of the heating device.

Figure 3:
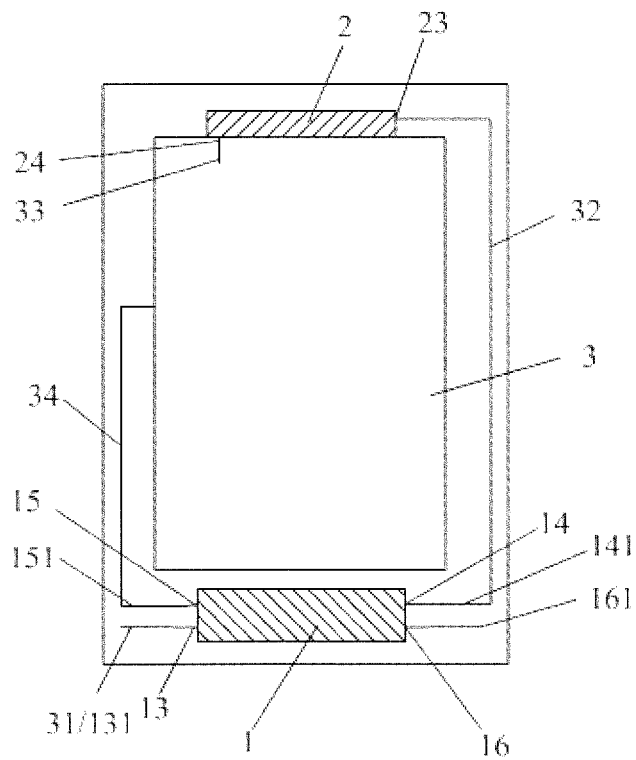
FIG. 3 is a structurally schematic view illustrating a heat recovery device in Embodiment 2 of the present disclosure.

In order to obtain the waste gas heat as much as possible, as shown in FIG. 3, the heat recovery device further includes a second recovery unit 2, which includes a second chamber 21 and a second communicating pipe 22 disposed inside the second chamber 21. The second chamber 21 has a second gas inlet 23 and a second gas outlet 24, and the second communicating pipe 22 is connected between the second gas inlet 23 and the second gas outlet 24 in an enclosed way. The second gas inlet 23 is connected to a connecting pipe 32 (i.e. a portion of an intake pipe located between the first recovery unit 1 and the second recovery unit 2) of the heating device 3 at the first gas outlet 14, and the second gas outlet 24 is connected to an intake pipe 33 of the heating device 3. That is, the second gas inlet 23 is connected to another end of the first exhaust pipe 141, and the second gas outlet 24 is connected to a relatively downstream intake pipe of the heating device 3. The second gas inlet 23 and the second gas outlet 24 may also be respectively provided with a second intake pipe and a second exhaust pipe correspondingly.

For example, the second communicating pipe 22 is a winding pipe. It is close to the chamber wall of the heating device 3 along the second chamber 21, and extends in the direction from the second gas inlet 23 to the second gas outlet 24. Namely, the second communicating pipe 22 may not be provided with a second waste gas inlet connected to a waste gas exhaust pipe of the heating device 3, but by allowing the second chamber 21 and the top of the heating device 3 to be directly contact and heat communicated, the waste gas heat at the top of the heating device 3 is further acquired (since an ascending dissipation mode is a usual way for heat, the waste gas heat at the top is relatively denser). Thus, the waste gas heat of the heating device 3 is continually absorbed and utilized by the intake gas of the heating device 3.

To better recover and utilize the obtained waste gas heat, the outsides of other walls of the second chamber 21 except for the wall with the second communicating pipe 22 provided thereon are each applied (e.g., coated) with a heat insulating material, such as a heat insulating cotton, so as to prevent heat dissipation. In another way, the outer walls of the second chamber 21 may be made with a hollow inner space, and the hollow inner space is filled with heat insulating material, such as heat insulating cotton.

Figure 4:
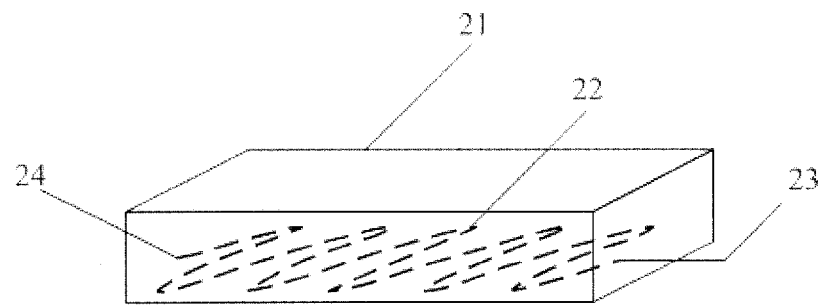
FIG. 4 is a structurally schematic view illustrating a second recovery unit in FIG. 3.

FIG. 4 is a structurally schematic view illustrating a second recovery unit 2. In accordance with FIG. 3, the intake gas of the heating device 3 comes out of the first recovery unit 1, and via the connecting pipe 32 connected between the first recovery unit 1 and the second recovery unit 2, enters the second communicating pipe 22 inside the second chamber 21 from the second gas inlet 23, and advances windingly/tortuously along the second communicating pipe 22, so as to absorb the heat dissipated from the top of the heating device 3, and then enters the heating device 3 via the intake pipe 33. The second communicating pipe 22 is denoted by dotted lines in FIG. 4, and this indicates that it is located inside the second chamber 21.

The heat recovery device adopts two afterheat recovery units, by adoption of such a design in the first recovery unit that the intake pipe of the heating device is winding and flat, and in such a manner that the intake pipe is surrounded by afterheat, the effective area of contact between the intake pipe of the heating device and the waste gas containing afterheat is made to be the maximum; on other hand, by the second recovery unit's directly absorbing the waste gas heat at the top of the heating device, the heat recovery of the heat recovery device is increased, and the recovered heat is directly used to raise the temperature of the intake gas of the heating device, so that the heat recovery efficiency is further increased.

In addition, the heat recovery device in the embodiment has a simple structure and a low cost. Moreover, during operation of the heating device, the maintenance cost of the heating device will not be increased due to adding a heat recovery device.

Embodiment 3

Figure 5:
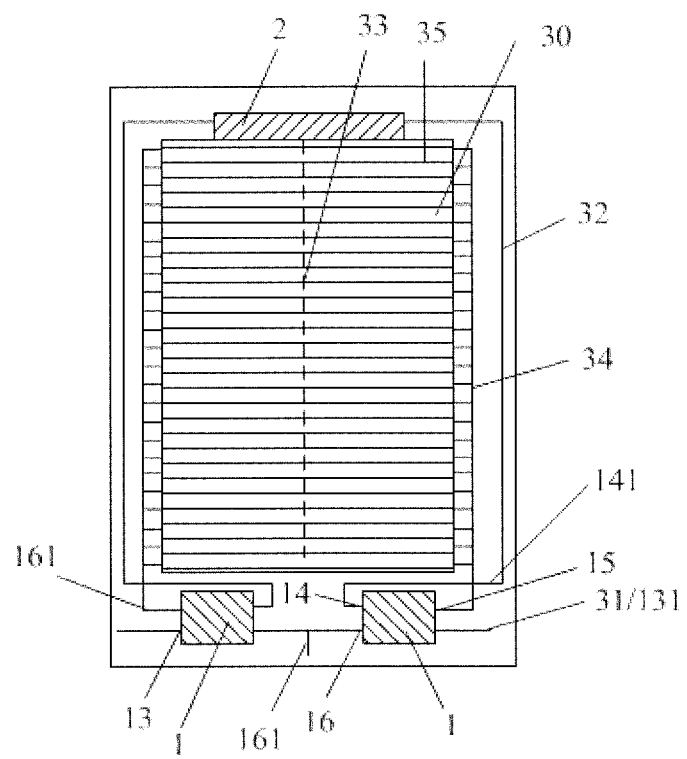
FIG. 5 is a schematic view illustrating the position of a heat recovery device in an alignment film curing system in Embodiment 3 of the present disclosure.

As an example, an alignment film curing system in a cell-forming process of a liquid crystal panel is provided by the embodiment. As shown in FIG. 5, the alignment film curing system includes a heater 30, which has a structure of top intake and side exhaust, and the heater 30 therein has a heat recovery device in Embodiment 1 or Embodiment 2 provided thereon.

In the heater 30, a plurality of heating chambers 35 arranged in a side-by-side and laminated manner are included, and a separate liquid crystal panel can be placed in each of the heating chambers 35 for alignment film curing process. In the intake gas heating system of the alignment film curing system, the intake gas enters from relatively inner sides of the heating chambers 35 arranged side-by-side, and is discharged from a relatively outer side of each of the heating chambers 35 arranged side-by-side.

To adapt to concurrent operation of the alignment film curing system, in the alignment film curing system according to the embodiment, two or more first recovery units 1 are provided, which are disposed on the bottom of the heating chambers 35 arranged in a single-row and laminated manner, respectively, and act to absorb heat in waste gas and to convert it into heat of the intake gas of the heater. One second recovery unit 2 is provided, which is disposed at a location corresponding to top of the side-by-side arranged heating chambers 35, and the wall of the second chamber 21 with the second communicating pipe 22 directly contact or communicated with the top of the heater 30, and the afterheat is utilized to the largest extent by means of recovering and utilizing the afterheat at the top of the curing furnace again. Dimensions of the first chamber 11 in the first recovery unit 1 and the second chamber 21 in the second recovery unit 2 as well as components inside them may be flexibly set in accordance with the dimension of the heater 30. In some examples, there may be two or more second recovery units 2 disposed on the top of the heating chambers 35.

Taking the heat recovery device with two heat recovery units in Embodiment 2 as an example, as shown in FIG. 5 as well as FIGS. 2A, 3 and 4, the first recovery unit 1 is disposed on the bottom of the heater 30, and a first waste gas intake pipe 151 is joined to an exhaust port of the heater 30 via an exhaust pipe 34, which collects the waste gas with afterheat of each heating chamber 35. The second recovery unit 2 is disposed on the top of the heater 30, and a second exhaust pipe is joined to an intake port of the heater 30 via an intake pipe 33.

In the alignment film curing system according to the embodiment, the intake gas of the heater 30 firstly passes through the first communicating pipe 12, and then passes through the second communicating pipe 22. The first communicating pipe 12 can be understood as a portion of the intake pipe of the heater 30, and the intake gas in it is pre-heated by the heat of waste gas within the first chamber 11. The second communicating pipe 22 can also be understood as a portion of the intake pipe of the heater 30, and the intake gas in it is further pre-heated by the heat dissipated from the top of the heater 30. The heat dissipated from the top of the curing furnace is recovered once more, and the intake gas is pre-heated twice by the waste gas.

In an alignment film curing system, in the case that recovery and utilization of afterheat of waste gas are not conducted, the intake gas temperature of a heater 30 is the room temperature (about 25° C.), the exhaust gas temperature is about 230° C., and the required heat for heating the gas completely comes from the heater 30. While in the alignment film curing system according to the embodiment, it is found after test that, by using the first recovery unit 1, a heat recovery utilization rate of about 30% can be obtained, and the intake gas temperature is approximately raised to about 120° C.; continually by using the second recovery unit 2, a heat recovery utilization rate of about 10% can be obtained in a second time, and the intake gas temperature is approximately raised to about 150° C. That is, the temperature of intake gas going into the heater 30 is about 150° C. Although it is the purpose of obtaining a set temperature (about 230° C.), on the condition that the intake gas temperature of the heater 30 is about 150° C., the burden of the heater 30 is greatly decreased. Therefore the afterheat of waste gas can be utilized to the maximum limit with the provision of two afterheat recovery units, so that the required heat when the intake gas is heated by the heater is saved, and it has a good energy-saving effect. Since only heat exchange happens between the intake gas and the waste gas, so that the product quality of the liquid crystal panel is not affected.

In the alignment film curing system of the present disclosure, by adding a heat recovery device, heat in exhaust of the heater and heat dissipated from its top of the alignment film curing system can be recovered. By utilizing the heat discharged from the alignment film curing system again, it is possible that temperature of the intake gas of the heater is raised, and the work load of the heater is decreased. The energy consumption is reduced, and the service life of the equipment is prolonged and the efficiency of the gas-supply heating system is enhanced, so as to achieve an object of the greatest extent of heat recovery. Thus, the issue in an alignment film curing system that the heat is directly discharged or the heat recovery utilization efficiency is low is solved, thus, the operation cost of the production line is reduced.

It should be understood here that, the alignment film curing system in the embodiment are merely examples of heat recovery and utilization of the heat recovery device, and it can also be applied to other occasions where a heating device is provided and there is a demand for heat recovery. In applications, it can be flexibly modified and used, and details are omitted here.

It is understood that the above embodiments or implementations are merely exemplary implementations used only for the purpose of explaining the principle of the present disclosure, but the invention is not limited thereto. For a person of ordinary skill in the art, a variety of variants and modifications can be made without departing from the spirit and essence of the disclosure. These variants and modifications shall fall in the scope of the present invention.

This application claims the priority of the Chinese patent application No. 201410707124.3, entitled 'Heat Recovery Device and Alignment Film Curing System', filed on Nov. 28, 2014, which is incorporated herein in its entirety by reference.

What is claimed is:

1. A heat recovery device capable of being disposed outside a heating device, comprising,
a first recovery unit including a first chamber and a first communicating pipe disposed within the first chamber, wherein the first chamber includes:
a first gas inlet;
a first gas outlet;
a first waste gas inlet; and
a first waste gas outlet;
wherein the first communicating pipe is arranged in a winding way and connected between the first gas inlet and the first gas outlet in an enclosed way, the first gas inlet is connected to a gas supply pipe of the heating device, the first gas outlet is connected to an intake pipe of the heating device, the first waste gas inlet is connected to an exhaust pipe of the heating device, and the first waste gas outlet is configured to discharge waste gas,
wherein a wedge-like extension member is provided between the first gas inlet and the first communicating pipe in the first chamber, a larger end of the extension member is adapted and joined to the first communicating pipe, and its smaller end is convergently shrunk and joined to the first gas inlet.

2. The heat recovery device according to claim 1, wherein the first gas inlet and the first gas outlet are located in two opposite walls of the first chamber; the first communicating pipe is in a flat shape and extended in a winding way from the first gas inlet to the first gas outlet along the first chamber, and the first communicating pipe does not contact walls of the first chamber.

3. The heat recovery device according to claim 2, further comprising a second recovery unit provided between the first recovery unit and the intake pipe of the heating device, the second recovery unit includes a second chamber and a second communicating pipe provided in the second chamber, wherein the second chamber has a second gas inlet and a second gas outlet, the second communicating pipe is connected between the second gas inlet and the second gas outlet in an enclosed way, the second gas inlet is connected to a connecting pipe that is connected to the first gas outlet, and the second gas outlet is connected to the intake pipe of the heating device.

4. The heat recovery device according to claim 1, wherein an airflow valve is disposed at a location where the first gas inlet is connected to the extension member, the airflow valve has strip-shaped openings; or, the airflow valve has mesh-shaped openings.

5. The heat recovery device according to claim 4, wherein the first communicating pipe and the extension member are made of stainless steel.

6. The heat recovery device according to claim 4, further comprising a second recovery unit provided between the first recovery unit and the intake pipe of the heating device, the second recovery unit includes a second chamber and a second communicating pipe provided in the second chamber, wherein the second chamber has a second gas inlet and a second gas outlet, the second communicating pipe is connected between the second gas inlet and the second gas outlet in an enclosed way, the second gas inlet is connected to a connecting pipe that is connected to the first gas outlet, and the second gas outlet is connected to the intake pipe of the heating device.

7. The heat recovery device according to claim 1, wherein the first communicating pipe and the extension member are made of stainless steel.

8. The heat recovery device according to claim 7, further comprising a second recovery unit provided between the first recovery unit and the intake pipe of the heating device, the second recovery unit includes a second chamber and a second communicating pipe provided in the second chamber, wherein the second chamber has a second gas inlet and a second gas outlet, the second communicating pipe is connected between the second gas inlet and the second gas outlet in an enclosed way, the second gas inlet is connected to a connecting pipe that is connected to the first gas outlet, and the second gas outlet is connected to the intake pipe of the heating device.

9. The heat recovery device according to claim 1, further comprising a second recovery unit provided between the first recovery unit and the intake pipe of the heating device, the second recovery unit includes a second chamber and a second communicating pipe provided in the second chamber, wherein the second chamber has a second gas inlet and a second gas outlet, the second communicating pipe is connected between the second gas inlet and the second gas outlet in an enclosed way, the second gas inlet is connected to a connecting pipe that is connected to the first gas outlet, and the second gas outlet is connected to the intake pipe of the heating device.

10. A heat recovery device capable of being disposed outside a heating device, comprising,
   a first recovery unit including a first chamber and a first communicating pipe disposed within the first chamber, wherein the first chamber includes:
   a first gas inlet;
   a first gas outlet;
   a first waste gas inlet; and
   a first waste gas outlet,
   wherein the first communicating pipe is arranged in a winding way and connected between the first gas inlet and the first gas outlet in an enclosed way, the first gas inlet is connected to a gas supply pipe of the heating device, the first gas outlet is connected to an intake pipe of the heating device, the first waste gas inlet is connected to an exhaust pipe of the heating device, and the first waste gas outlet is configured to discharge waste gas; and
   a second recovery unit provided between the first recovery unit and the intake pipe of the heating device, the second recovery unit includes a second chamber and a second communicating pipe provided in the second chamber, wherein the second chamber has a second gas inlet and a second gas outlet, the second communicating pipe is connected between the second gas inlet and the second gas outlet in an enclosed way, the second gas inlet is connected to a connecting pipe that is connected to the first gas outlet, and the second gas outlet is connected to the intake pipe of the heating device.

11. The heat recovery device according to claim 10, wherein the second communicating pipe is a winding pipe, which is close to the chamber wall of the heating device along the second chamber, and extends in a direction from the second gas inlet to the second gas outlet.

12. The heat recovery device according to claim 11, wherein outsides of all the walls of the first chamber, and outsides of other walls of the second chamber except the wall with the second communicating pipe provided thereon are each applied with heat insulating material.

13. The heat recovery device according to claim 10, wherein the second recovery unit directly contact the top of the heating device.

14. An alignment film curing system, comprising, a heater, wherein the heater includes a heat recovery device capable of being disposed outside a heating device, wherein the heat recovery device comprises:
   a first recovery unit including a first chamber and a first communicating pipe disposed within the first chamber, wherein the first chamber includes:
   a first gas inlet;
   a first gas outlet;
   a first waste gas inlet; and
   a first waste gas outlet;
   wherein the first communicating pipe is arranged in a winding way and connected between the first gas inlet and the first gas outlet in an enclosed way, the first gas inlet is connected to a gas supply pipe of the heating device, the first gas outlet is connected to an intake pipe of the heating device, the first waste gas inlet is connected to an exhaust pipe of the heating device, and the first waste gas outlet is configured to discharge waste gas; and
   a second recovery unit provided between the first recovery unit and the intake pipe of the heating device, the second recovery unit includes a second chamber and a second communicating pipe provided in the second chamber, wherein the second chamber has a second gas inlet and a second gas outlet, the second communicating pipe is connected between the second gas inlet and the second gas outlet in an enclosed way, the second gas inlet is connected to a connecting pipe that is connected to the first gas outlet, and the second gas outlet is connected to the intake pipe of the heating device.

15. The alignment film curing system according to claim 14, wherein the first chamber is provided at the bottom of the heater, and the first waste gas inlet and an exhaust port of the heater are connected by an exhaust pipe, the second recovery unit is provided on the top of the heater, and the second gas outlet and an intake port of the heater are connected by an intake pipe.

16. The heat recovery device according to claim 14, wherein a wedge-like extension member is provided between the first gas inlet and the first communicating pipe in the first chamber, a larger end of the extension member is adapted and joined to the first communicating pipe, and its smaller end is convergently shrinked and joined to the first gas inlet.

17. The heat recovery device according to claim 16, wherein an airflow valve is disposed at a location where the first gas inlet is connected to the extension member, the airflow valve has strip-shaped openings; or, the airflow valve has mesh-shaped openings.

\* \* \* \* \*